United States Patent [19]

Drutchas et al.

[11] 4,248,194

[45] Feb. 3, 1981

[54] METHOD AND APPARATUS FOR CONTROLLING THE OPERATION OF A PUMP

[75] Inventors: Gilbert H. Drutchas, Birmingham, Mich.; David N. Wormley, Needham, Mass.

[73] Assignee: TRW Inc., Cleveland, Ohio

[21] Appl. No.: 68,943

[22] Filed: Aug. 23, 1979

[51] Int. Cl.³ .......................... F02B 3/00; F02M 39/00
[52] U.S. Cl. .................................... 123/357; 123/390; 123/497; 417/20; 417/22
[58] Field of Search .................... 60/39.28; 222/71; 123/136, 139 AW, 139 AY, 140 FG; 417/20, 22, 43, 44

[56] References Cited

U.S. PATENT DOCUMENTS

| | | | |
|---|---|---|---|
| 3,861,363 | 1/1975 | Williams et al. | 123/32 EA |
| 3,973,538 | 8/1976 | Williams | 123/139 E |
| 4,108,574 | 8/1978 | Bartley | 417/20 |
| 4,125,093 | 11/1978 | Platzer | 123/32 EA |

Primary Examiner—Ronald B. Cox

[57] ABSTRACT

An improved method and apparatus is provided to control the rate at which fuel is supplied to an engine by a fuel pump. The fuel pump has an output pressure which varies with pump operating speed in accordance with different curves of a series of curves. In order to determine which curve of the series of curves is representative of the manner in which the fuel pump output varies with pump speed at one time, the fuel pump operating speed and output pressure are simultaneously sensed to determine a point on an initial curve. The fuel pump operating speed is subsequently varied in accordance with the initial curve to provide a desired variation in fuel pump output to the engine. The fuel pump operating speed and output pressure are periodically simultaneously sensed to determine if the fuel pump output still varies in accordance with the initial curve or has changed to a second curve of the series of curves. If it is determined that a second curve is representative of the manner in which the fuel pump output varies with pump speed, the fuel pump operating speed is subsequently varied in accordance with the second curve.

37 Claims, 9 Drawing Figures

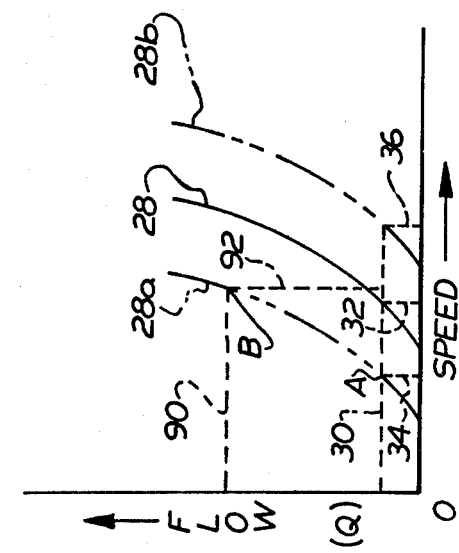
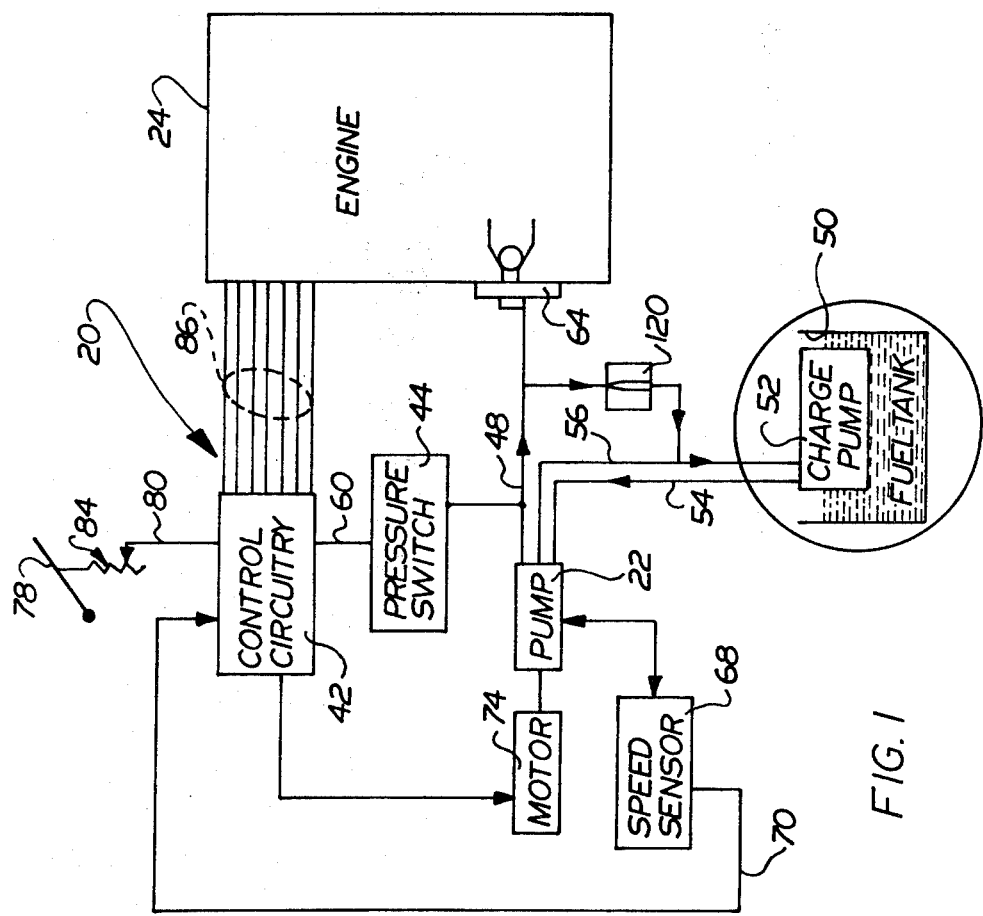
FIG. 2
FIG. 1

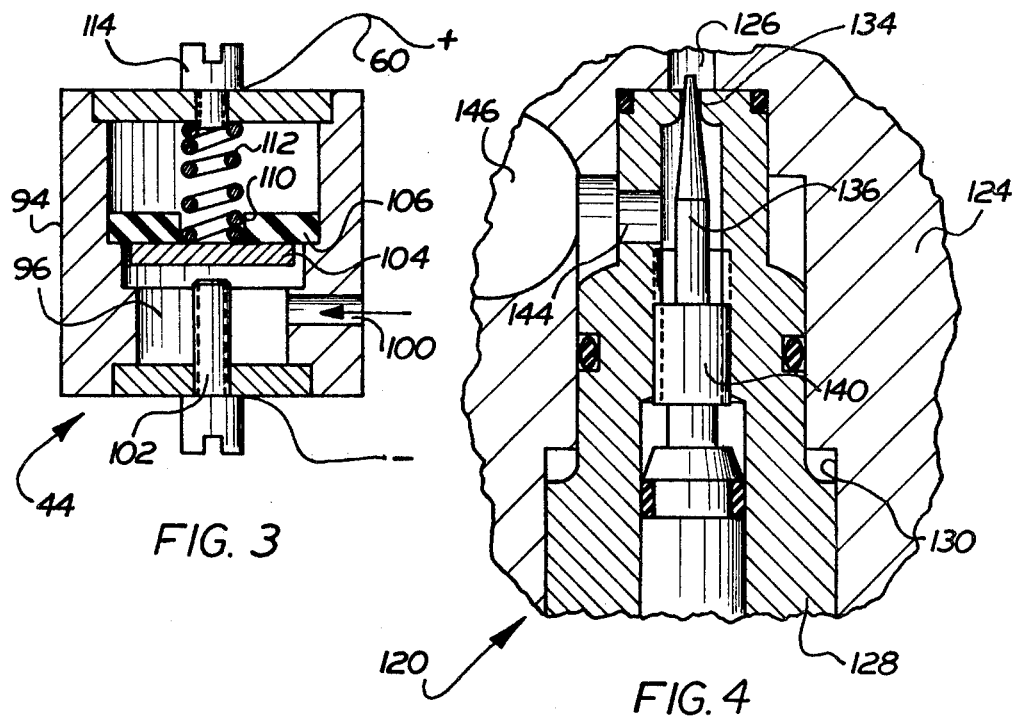
FIG. 3
FIG. 4
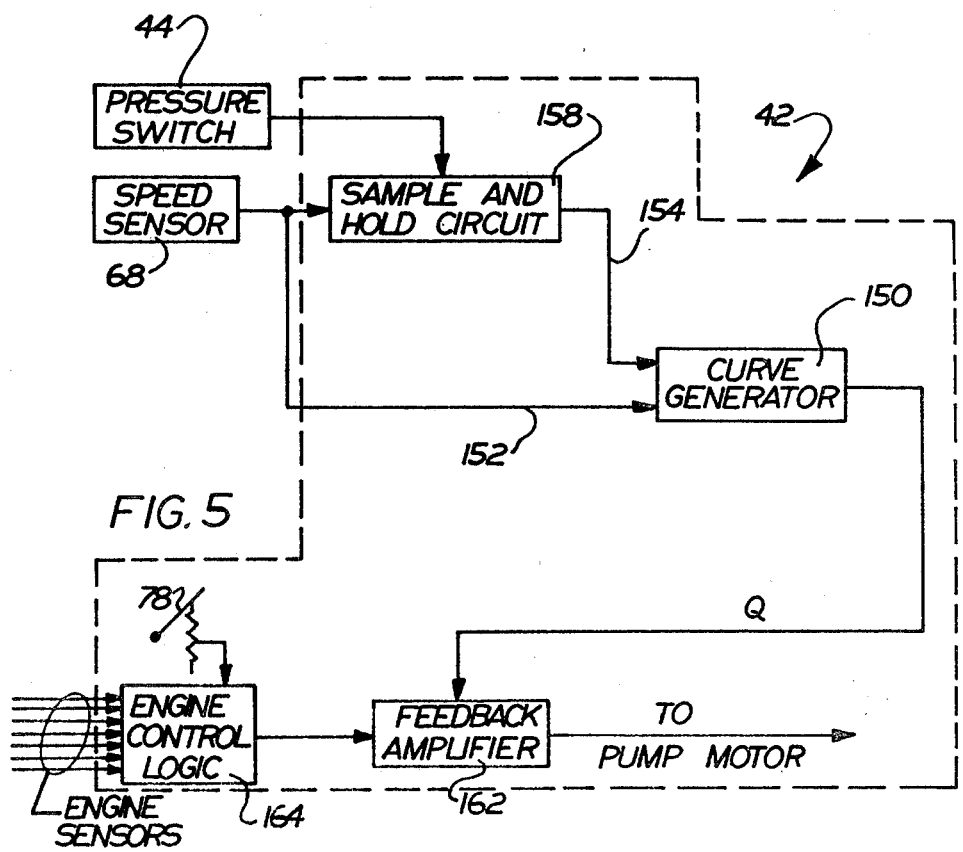
FIG. 5

METHOD AND APPARATUS FOR CONTROLLING THE OPERATION OF A PUMP

BACKGROUND OF THE INVENTION

This invention relates to a method and apparatus for controlling the fluid flow rate from a pump. The method and apparatus are advantageously used to control the flow of fuel to an internal combustion engine.

The rate of flow of fluid from a pump varies with variations in the operating speed of the pump. In addition, the rate of flow of fluid from a pump varies with other factors such as changes in ambient temperature and pressure and pump wear. Since pump output is not strictly a function of pump speed, flow meters have been utilized in many control systems requiring accurate pump output information. Such a control system may be used to control a flow of fuel from a fuel pump to an engine. Of course, flow meters are relatively costly and also require a finite amount of time to provide a control signal. Other control systems are known which do not utilize a flow meter to measure pump output. However, these systems must rely upon an error signal being provided if the pump output does not achieve a desired fuel flow rate. Therefore, a delay occurs before the error is corrected.

SUMMARY OF THE PRESENT INVENTION

The present invention relates to a method and apparatus for use in controlling the rate at which fluid is discharged from a pump. The rate at which fluid is discharged from a pump is varied by changes in both pump operating speed and pump operating conditions, such as ambient temperature and pressure and the amount of wear of pump components. Therefore, a single curve cannot accurately indicate the manner in which pump output varies with pump operating speed. However, a series or family of curves can indicate the manner in which pump output varies with variations in pump operating speed and pump operating conditions. These curves are derived for a particular pump by testing similar pumps under many different operating conditions.

In order to determine which curve of the series of curves is representative of the manner in which pump output varies with pump speed, the pump output pressure and operating speed are simultaneously sensed during operation of the pump. By simultaneously sensing pump operating speed and output pressure, it is possible to determine a point on the particular curve that indicates the manner in which pump output varies with pump operating speed for the pump operating conditions at that time.

It is contemplated that pump operating conditions may vary during operation of the pump. Thus, the temperature and pressure at which the pump is operated may vary. In addition, the efficiency of the pump will vary with wear of the various components of the pump. Due to changes in the foregoing and other pump operating conditions, the manner in which pump output varies with pump operating speed will change over a period of time. Therefore, the pump operating speed and output pressure are periodically sensed in order to determine whether or not the manner in which the output from the pump varies with pump operating speed is still represented by the initial curve or has changed to a second curve of the series of curves.

The sensing of pump operating speed and output pressure can be initiated in response to the occurrence of many different events. When the pump is used to supply fuel to the engine of a vehicle, sensing of fuel pump operating speed and output pressure is advantageously initiated each time the fuel pump output pressure is reduced to a predetermined pressure. This predetermined pressure is slightly greater than the fuel pump output pressure which is present when the engine is idling.

Accordingly, it is an object of this invention to provide a new and improved method and apparatus for controlling the operation of a pump to provide a desired fluid flow rate from the pump.

Another object of this invention is to provide a new and improved method and apparatus for controlling the rate at which fuel is supplied to an engine and wherein a determination is made of which curve of a series of curves is representative of the manner in which fuel pump output varies with pump speed by simultaneously sensing fuel pump operating speed and output pressure during engine operation.

BRIEF DESCRIPTION OF THE DRAWINGS

The foregoing and other objects and features of the present invention will become more apparent upon a consideration of the following description taken in connection with the accompanying drawings wherein:

FIG. 1 is a schematic illustration of a pump control apparatus constructed in accordance with the present invention, the apparatus being illustrated in association with the engine of a vehicle;

FIG. 2 is a chart illustrating a series of pump output characteristic curves which indicate the manner in which pump output varies with pump operating speed for different pump operating conditions;

FIG. 3 is a sectional view of a pressure switch used in the control apparatus of FIG. 1 to determine when the pump has a predetermined output pressure;

FIG. 4 is a sectional view illustrating the construction of a valve which is adjusted to limit the maximum rate at which fuel is conducted to an engine;

FIG. 5 is a schematic illustration of an analog embodiment of the control apparatus;

DESCRIPTION OF SPECIFIC PREFERRED EMBODIMENTS OF THE INVENTION

General Mode of Operation

Figure 6:
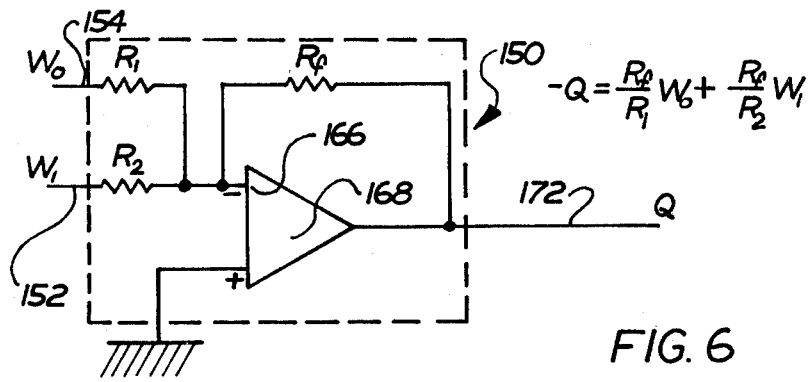
FIG. 6 is a schematic illustration of circuitry utilized in the control apparatus of FIG. 5.

A control apparatus 20 (FIG. 1) constructed and operated in accordance with the present invention is utilized to control the operation of a pump 22 of a pump and motor assembly to provide a desired rate of flow of fuel to a vehicle engine 24. During operation of the engine 24, changes will occur in the fuel pump operating conditions, that is, changes will occur in ambient temperature and pressure, leakage between working chambers of the pump, and friction and viscous drag on pump components. In addition, the components of the pump 22 will wear as the pump is used to further vary the pump operating conditions.

A change in fuel pump operating conditions results in a shift of a fuel pump output characteristic curve which indicates the manner in which fuel pump output varies with pump operating speed. When the fuel pump 22 is being operated under standard or ideal operating conditions, the pump output characteristic curve 28 is disposed in the position shown in solid lines in FIG. 2. However as pump operating conditions change, the pump output characteristic curve will shift toward either the curve illustrated in dashed lines at 28a in FIG. 2 or toward the curve illustrated in dashed lines at 28b in FIG. 2.

The curves 28, 28a and 28b are merely representative of a large number of curves included in a family or series of curves indicating how the output from the pump 22 varies with pump operating speed for different pump operating conditions. The curves 28, 28a and 28b are determined by testing, under various operating conditions, a number of pumps having the same construction as the pump 22. Although the operating characteristic curves 28, 28a, and 28b for the pump 22 were determined by testing other pumps having the same construction as the pump 22, the curves accurately reflect the manner in which the output of the pump 22 varies with pump speed and operating conditions.

The shift in the pump output characteristic curve 28 due to changes in pump operating conditions results in a change in the speed at which the pump 22 must be driven in order to obtain a desired fuel flow rate. Thus, if it is desired to obtain the fuel flow rate indicated by the dashed line 30 in FIG. 2, it would be necessary to drive the pump 22 at the speed indicated by the dashed line 32 when the pump is being operated under the standard or ideal conditions represented by the pump output characteristic curve 28. However, if a change in pump operating conditions causes the efficiency of the pump to increase, there is a shift in the pump characteristic curve toward the left (as viewed in FIG. 2) to the position indicated at 28a. It is then necessary to drive the pump at a somewhat lower speed indicated by the dashed line 34 to obtain a fluid flow rate indicated by the line 30.

Similarly, if a change in pump operating conditions causes the efficiency of the pump 22 to decrease, there is a shift in the pump characteristic curve toward the right (as viewed in FIG. 2) to the position indicated at 28b. It is then necessary to drive the pump at a somewhat higher speed indicated by the dashed line 36 to obtain a flow rate indicated by the line 30.

In the control system illustrated in FIG. 1, the rate of flow of fuel to the vehicle engine 24 is controlled by varying the speed at which the pump 22 is driven. Thus, to increase the rate of flow of fuel to the engine 24 to a desired fuel flow rate, the output speed of the pump 22 is increased to a speed corresponding to the desired fuel flow rate. When the rate of flow of fuel to the engine 24 is to be decreased to a different fuel flow rate, the speed at which the pump is driven is decreased to a speed corresponding to the reduced fuel flow rate. The desired fuel flow rate varies as a function of throttle position, air-fuel ratio, and engine load.

Changes in the pump operating conditions and the resulting shifts in the pump output characteristic curve affect the rate at which fuel is discharged from the pump 22 for a given pump operating speed. Therefore, it is necessary to control the operating speed of the pump 22 as a function of both variations in the pump operating conditions and as a function of variations in the desired fuel flow rate to the engine. Variations in the desired fuel flow rate include variations in throttle demand and engine fuel system requirements. If the pump operating speed was controlled merely as a function of a desired fuel flow rate to the engine, the actual fuel flow rate to the engine would be different than the desired fuel flow rate due to shifting of the pump output characteristic curve with changes in pump operating conditions.

In order to enable the control apparatus 20 to compensate for changes in pump operating conditions, the control apparatus senses actual fuel pump operating characteristics and transmits signals corresponding to these operating characteristics to control circuitry 42. Although different pump operating characteristics could be sensed in different ways, it is preferred to sense the output pressure from the pump 22 with a pressure switch 44. The pressure switch 44 is actuated when the fluid pressure in a fuel line 48 extending between the pump 22 and the engine 24 reaches a predetermined pressure corresponding to the fuel flow rate indicated by the dashed line 30 in FIG. 2.

During operation of the pump 22, fuel is supplied from a tank 50 to the pump 22 by a charge pump 52 through a fuel line or conduit 54. Excess fuel supplied to the pump 22 by the charge pump 52 is returned to the fuel tank 50 through a conduit 56. When the pump output pressure in the conduit 48 exceeds a predetermined pressure, the pressure switch 44 is actuated and a signal is transmitted to the control circuitry 42 through a lead 60.

The pump 22 is discharging fuel through the line 48 to a constant size orifice in a fuel control valve 64. Hence, the pressure in the conduit 48 varies as a direct function of the rate of flow of fuel in the conduit 48. Therefore, when a predetermined pressure is obtained in the fuel line 48, a predetermined fuel flow rate is present. This predetermined fuel flow rate is the fuel flow rate represented by the dashed line 30 in FIG. 2.

In order to locate the pump characteristic curve relative to the pump speed and pump output coordinates of FIG. 2, it is necessary to know the speed at which the pump is operating when the predetermined fuel flow rate represented by the dashed line 30 is present. Accordingly, a speed sensor or tachometer 68 is connected with the pump 22 and provides an output signal over a lead 70 to the control circuitry 42. The output signal from the speed sensor 68 is indicative of the speed at which the pump is actually being driven.

The control circuitry 42 utilizes two operating characteristics, that is speed and output pressure, of the pump 22 to determine the location of a point on one curve of the series or family of pump output characteristic curves represented in FIG. 2 by the curves 28, 28a and 28b. Once the location of a point on a pump output characteristic curve has been determined, the location of the whole curve relative to the pump operating speed and flow coordinates of FIG. 2 is known. The desired rate of fuel flow relative to system requirements can then be obtained by adjusting the speed at which a motor 74 drives the pump 22. In the present instance, the characteristics of pump output pressure and pump speed are simultaneously sensed by the pressure switch 44 and speed sensor or tachometer 68. These two characteristics enable a point on one of the pump output characteristic curves of the series or family of curves to be determined in terms of pressure and speed.

Accordingly, if an operator of the vehicle actuates an accelerator pedal 78 to provide a signal over lead 80 to control circuitry 42 indicating that a change in the fuel flow rate to the engine 24 is desired, the control circuitry 42 merely commands the motor 74 to drive the pump 22 at a speed corresponding to the new flow rate. It should be noted that the control circuitry 42 receives numerous inputs from the internal combustion engine 24 through leads indicated at 86 in FIG. 1. These inputs are combined with the desired fuel flow rate signal transmitted from an accelerator pedal actuated signal generator 84 to provide a desired fuel flow control signal which will maximize the performance of the engine 24 while minimizing the pollutants discharged from the engine.

When the engine 24 is initially started, the engine is operated at a relatively low idle speed and the motor 74 drives the pump 22 to provide a predetermined relatively low fuel flow rate to the engine 24. At this time the pressure in the fuel line 48 is insufficient to actuate the pressure switch 44.

When the accelerator pedal 78 is depressed slightly to indicate a desired fuel flow rate which exceeds the fuel flow rate when the engine is idling, the control circuitry 42 effects operation of the motor 74 to drive the pump 22 at a speed sufficient to increase the pump discharge pressure to a pressure which is effective to actuate the switch 44. Assuming that the pump is, at this time, being operated under conditions in which the pump output characteristic curve is correctly indicated by the curve 28a in FIG. 2, the output signal from the speed sensor 68 at the instant the pressure switch 44 is axctuated would correspond to the speed indicated in dashed lines at 34 in FIG. 2. At this time, the fuel flow rate or output pressure from the pump 22 would be represented by the dashed line 30 in FIG. 2. This information enables the control circuitry 42 to properly offset the nominal pump characteristic curve represented by the solid line 28 in FIG. 2 to command the motor 74 to drive the pump 22 at a speed corresponding to a desired fuel flow rate.

After the location of the pump output characteristic curve has been determined by the signals from the pressure sensing switch 44 and speed sensor 68, the control circuitry 42 can accommodate changes in demand for fuel by merely adjusting the speed at which the motor 74 is operated to drive the pump 22. Thus when the accelerator pedal 78 is actuated after it has been determined that the curve 28a represents the correct pump output characteristic curve, the speed of the motor 74 is increased to a speed corresponding to the desired fuel flow. Assuming that the throttle demand and engine requirement through the control circuitry 42 have established a desired fuel flow rate indicated by the horizontal dashed line 90 in FIG. 2, the control circuitry 42 would increase the voltage transmitted to the motor 74 to a voltage corresponding to the speed indicated by the position of the vertical dashed line 92 in FIG. 2.

It is contemplated that during operation of the engine 24 the conditions under which the pump 22 is operated will change. Therefore, the actual output characteristics of the pump 22 are periodically sensed in order to detect shifts in th pump output characteristic curve. In the embodiment of the invention illustrated in FIG. 1, the pump output pressure and operating speed are simultaneously sensed each time the pump output is reduced to a predetermined value. Thus, the pressure switch 44 is effective to detect when the predetermined fuel flow rate is present each time the fuel flow rate from the pump 22 decreases to a flow rate which is less than the predetermined flow rate detected by the pressure switch. The predetermined flow rate and pressure are slightly greater than the flow rate and pressure which are present during engine idle conditions.

If during operation of the engine 24 the accelerator pedal 78 is released, the fuel flow rate to the engine 48 is decreased to the idle fuel flow rate. The pressure switch 44 is again actuated when the accelerator pedal is depressed and the fuel line pressure increases. This enables the control circuitry 42 to determine whether or not the relatively low predetermined fuel flow rate represented by the horizontal dashed line 30 was obtained at the same speed as before or at a different speed. A change in the speed at which the predetermined flow rate is obtained clearly indicates a shift in the pump output characteristic curve as a result of a change in pump operating conditions.

Although only a single pressure switch 44 has been shown in FIG. 1, it is contemplated that a plurality of pressure switches could be associated with the control circuitry 42. Thus, a second pressure switch could be utilized to detect when the fuel flow rate to the engine falls below a predetermined fuel flow rate which is greater than the relatively low predetermined fuel flow rate detected by the pressure switch 44. This would result in a sensing of the fuel pump operating characteristics at two different pump speeds.

Pressure Switch

Although the pressure switch 44 could have many different constructions, it is contemplated that the pressure switch 44 could advantageously be constructed in the manner shown in FIG. 3 in which the pressure switch is illustrated in an open condition. The pressure switch 44 includes a housing 94 having a pressure chamber 96 which is connected with the fuel flow line 48 through an inlet 100. The pressure switch 44 has a fixed contact formed by a screw 102 which extends into the pressure chamber 96. A movable contact 104 is formed by a plate which is secured to a rubber diaphragm 106 in such a manner as to prevent leakage of fuel from the chamber 96 through a central opening 110 in the diaphragm 106. A metal spring 112 extends between the switch plate 104 and an output terminal 114 to urge the plate 104 toward the fixed contact 102.

When the pressure in the fuel line 48 is below the predetermined pressure corresponding to the fuel flow rate indicated by the dashed line 30 in FIG. 2, the spring 112 is effective to cause the metal plate 104 to engage the fixed contact 102 to complete a circuit through the pressure switch 44. When the pressure in the fuel line 48 increases to the predetermined pressure corresponding to the predetermined flow rate represented by the dashed line 30 in FIG. 2, the fluid pressure against the plate 104 and diaphragm 106 is sufficient to move the plate out of engagement with the fixed contact 102. The movement of the plate 104 interrupts the circuit and provides a signal to the control circuitry 42 indicating that the predetermined pressure is present. At this time the predetermined fuel flow rate is present in the fuel line 48.

The spring 112 is sized so that the plate 104 is pressed against the fixed contact 102 until the output pressure from the pump 22 exceeds the pressure which is present at an engine idle condition by a predetermined, relatively small amount. Therefore, each time the engine operating speed is reduced to an idle speed, the full pressure in the chamber 96 decreases to a value which is insufficient to hold the pressure switch 44 open. Therefore, the pressure switch 44 is actuated each time the engine operating speed is reduced to idle speed.

Trim Valve

It is contemplated that the pump 22 will have a maximum fuel flow output capability which may be slightly greater than the desired maximum fuel flow to the engine 24. In order to compensate for this excess pump capacity, a trim valve 120 (FIG. 1) is provided to control the maximum pump output flow and to provide uniform flow performance with different pumps. The trim valve 120 (see FIG. 4) includes a housing 124 which is connected in fluid communication with the fuel line 48 through an inlet 126. A valve body 128 is disposed in a valve chamber 130 in the housing 124.

The rate of flow of fuel through a port 134 in the valve body 128 is controlled by a needle valve 136. The needle valve 136 has a threaded body section 140 which engages corresponding threads in the valve body 128 to enable the position of the needle valve 136 to be adjusted. The fuel which flows through the port 134 is conducted to an outlet port 144 leading to a passage 146 which is connected with the drain or fluid return conduit 56.

Control Circuitry

It is contemplated that the control circuitry 42 could be constructed many different ways. In the embodiment shown in FIG. 5, the control circuitry 42 includes a function or curve generator 150 which responds to inputs over the lines 152 and 154 to provide an output signal which varies in a manner corresponding to the configuration of the pump flow characteristic curve 28. The input to the function generator 150 from the speed sensor 68 over the lead 152 indicates the actual speed at which the fuel pump is being driven by the motor 74.

The input to the function or curve generator 150 over the lead 154 indicates the amount by which the output from the function generator is to be offset to compensate for variations in pump operating conditions. The input to the function generator 150 over the lead 154 comes from a sample and hold circuit 158 which receives an input from the speed sensor 68. When the pressure switch 44 is actuated to indicate that a predetermined fluid pressure and flow rate are present at the discharge from the pump 22, the sample and hold circuit 158 retains the output signal from the speed sensor 68. Until the pressure switch 44 is again actuated, the sample and hold circuit 158 provides an output signal which is a function of the speed at which the pressure switch was actuated.

The output signal from the function or curve generator 150 represents the actual fuel flow rate to the engine 24. The actual fuel flow rate signal from the function generator 150 is transmitted to a feedback amplifier 162. The feedback amplifier 162 is effective to compare the fuel flow rate indicated by the signal from the function generator 150 with a desired fuel flow rate signal.

The desired fuel flow rate signal is determined by the position of the accelerator pedal 78 and engine control logic circuitry 164. The engine control logic circuitry 164 receives inputs indicative of many different engine operating conditions from a plurality of sensors. These signals are combined with the throttle position input signal to provide an output signal indicative of a desired fuel flow rate.

If the desired fuel flow rate signal from the control circuitry 164 agrees with the signal from the function generator 150, the output from the feedback amplifier 162 does not vary and the pump motor 74 continues to drive the pump at the same speed. However, if there is a difference between the desired fuel flow rate signal as indicated by the engine control logic circuitry 164 and the actual fuel flow rate indicated by the output from the function generator 150, the output from the feedback amplifier 162 causes a corresponding change in the speed of the pump drive motor 74. Although it is preferred to utilize the engine control logic circuitry 164 to determine the desired fuel flow rate as a function of many different engine operating conditions, it is contemplated that the engine control logic circuitry could be eliminated and the desired fuel flow rate determined as a function of only throttle position if desired.

In an embodiment of the invention in which the pump output characteristic curve has a linear configuration rather than the nonlinear configuration illustrated in FIG. 2, the function generator 150 can be constructed in the manner illustrated in FIG. 6. In this embodiment of the invention the input to an inverting terminal 166 of an operational amplifier 168 is from the speed sensor 68 over the lead 152. This input is conducted through the resistance $R_2$. The noninverting terminal of the operational amplifier 168 is connected to ground.

The signal from the sample and hold circuit 158 (FIG. 5) is conducted through the lead 154 (FIG. 6) to the input of the operational amplifier 168 through resistance $R_1$. In this embodiment the operational amplifier 168 is a summing amplifier. The resulting output signal over lead 172 is a voltage that represents the magnitude of fuel flow through the conduit 48. The equivalent magnitude of the fuel flow rate through the conduit 48 is equal to the value of resistance $R_F$ divided by the value of the resistance $R_1$ times the input voltage over the lead 154 ($W_o$) plus the value of the resistance $R_F$ divided by the resistance $R_2$ times the voltage on the lead 152 ($W_1$). The negative before the Q term results from the amplifier's inverting characteristic.

Figure 7:
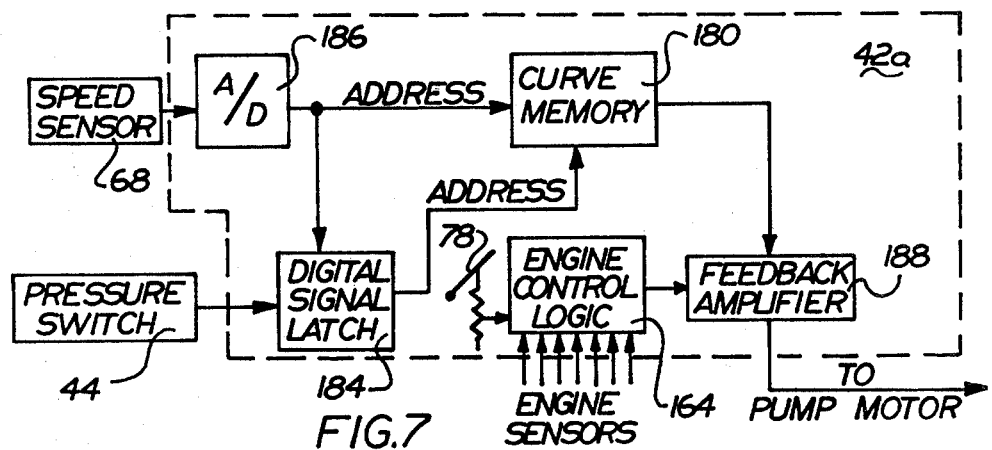
FIG. 7 is a schematic illustration of a digital embodiment of the control apparatus.

In the embodiment of the invention illustrated in FIGS. 5 and 6, the control circuitry 42 has an analog construction. In the embodiment illustrated in FIG. 7, the control circuitry 42a has a digital construction. It is contemplated that the embodiment 42a of the control circuitry illustrated in FIG. 7 may be preferred to the embodiment 42 shown in FIGS. 5 and 6.

The control circuitry 42a includes a curve memory unit 180 in which groups of data corresponding to the pump output characteristic curves for different pump operating conditions are stored. Thus, each group of data stored in the curve memory 180 corresponds to a pump output characteristic curve for a particular operating condition. For example, one group of data would represent the pump output characteristic curve 28 of FIG. 2, another group of data would represent the pump output characteristic curve 28a of FIG. 2, and the third group of data would represent the curve 28b of FIG. 2.

Each group of data has an address which is composed of two parts. The first part of the address is representative of the pump operating conditions and indicates which group of data is applicable. The second part of the address is representative of the speed at which the pump is being driven to enable the flow rate to be determined from the correct group of data.

The part of the address which indicates pump operating conditions is provided by a digital signal latch 184. The digital signal latch 184 is provided with an input from the speed sensor 68 through an analog to digital convertor 186. When the pressure switch 44 is actuated, the digital signal latch 184 stores the speed at which the pump is being driven to obtain the known fuel flow pressure and rate.

The output from the digital signal latch 184 is a function of the speed signal at which the predetermined fuel flow rate was obtained. The output signal from the digital signal latch forms the first part of an address in the memory unit 180 and is indicative of the particular group of data which is to be read.

As the fuel flow rate is varied, the output from the speed sensor 68 is varied. This signal is transmitted to the memory unit 180. This enables the actual pump operating speed to be used in association with the group of data selected on the output from the digital signal latch 184. The data read out from the selected group of data in the memory unit 180 is transmitted to a feedback amplifier 188.

The group of data selected by the output from the digital signal latch 184 corresponds to the pump operating characteristic curve which is representative of actual pump operating conditions at the time when the pressure switch 44 was last actuated. This group of data is utilized at least until the switch 44 is again acutated and the pump operating conditions are again sensed. If the pump operating conditions do not change by the next time the pressure switch 44 is actuated, the output from the digital signal latch 184 will not change and the same group of data will continue to be read. However, if the pump operating conditions have changed, the output from the digital signal latch 184 will change to indicate a new group of data the next time the pressure switch 44 is actuated.

The feedback amplifier 188 compares the output from the memory unit 180 with the desired fuel flow rate as indicated by the setting of the accelerator pedal 78 (FIG. 7) and the requirements of the engine control logic circuitry 164. If the actual fuel flow rate as indicated by the memory unit 180 is equal to the desired fuel flow rate as indicated by the setting of the accelerator pedal 78 and requirements of the logic circuitry 164, the operating speed of the pump motor 74 remains constant. However, if there is a difference between the fuel flow rate indicated by the memory unit 180 and the desired fuel flow rate, the output from the feedback amplifier 188 is effective to change the speed at which the motor 74 drives the pump 22.

Figure 8:
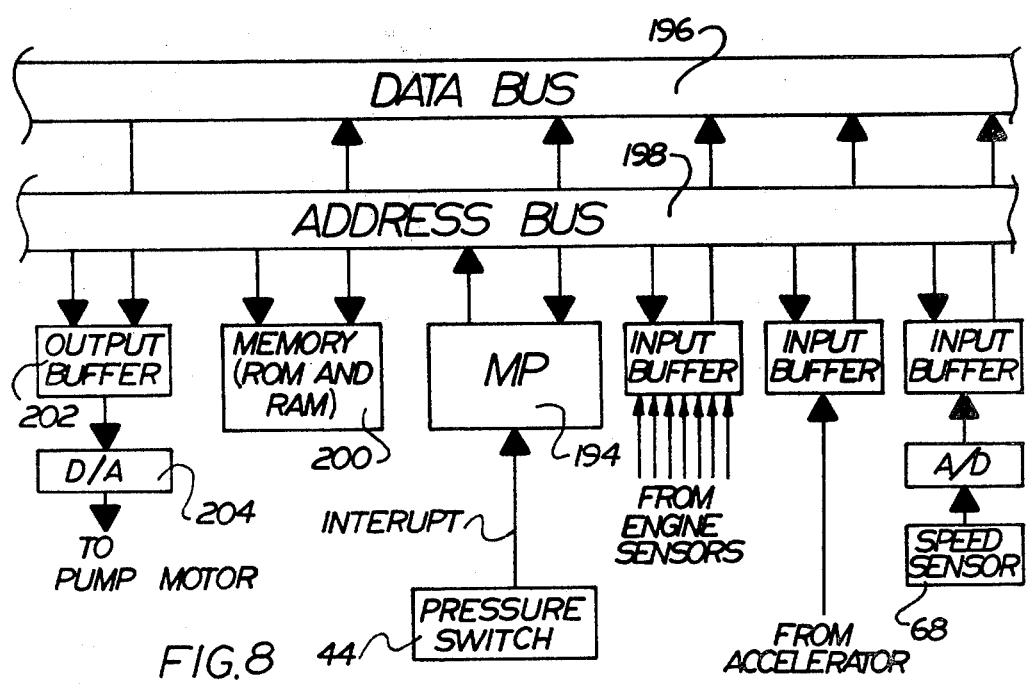
FIG. 8 is a schematic illustration of an embodiment of the control apparatus which utilizes a microprocessor.

It is also contemplated that the control circuitry 42 could include a microprocessor which would be utilized in association with a suitable memory unit. This embodiment of the invention is illustrated in FIG. 8 and includes a microprocessor 194 which is effective to transmit and receive data from a data bus 196. In addition, the microprocessor is effective to transmit data to an address bus 198. The data and address buses are connected with a memory unit 200. A flow chart for the operation of the microprocessor 194 and memory unit 200 is set forth in FIG. 9.

When the engine 24 is started, the inputs from the engine control and throttle position sensors are processed through the microprocessor 194 (FIG. 8) and memory unit 200. An initial pump speed signal is transmitted through an output buffer 202 to the pump motor 74 through a digital to analog convertor 204. Assuming that the pressure switch 44 is then actuated, a program interrupt signal is provided.

The program interrupt signal causes the memory 200 (FIG. 8) to store an operating condition speed signal (A) which corresponds to the actual speed of the motor 74 when the predetermined flow rate required to actuate the pressure switch 44 is present. The pump speed and pressure level designate the specific pump output characteristic curve that applies as well as the value of the predetermined flow rate in the memory unit 200. The speed increment that establishes the predetermined flow rate magnitude is graphically shown as the intersection of horizontal line 30 with vertical line 34 which is designated point A on curve 28a of FIG. 2.

During continued vehicle operation, the actual pump flow rate for a particular engine operating speed is represented by the dashed line 90. The line 90 intersects the curve 28a at a point designated as point B in FIG. 2. Point B is above the speed at which the pressure switch is actuated. The micro-processor establishes the magnitude of the speed difference between the speed represented as line 30, that is attained at the predetermined flow and the pump's actual speed depicted as a line 90, FIG. 2. This speed difference, the horizontal distance between point B and point A, FIG. 2, is translatable, through the memory 200, to a value of flow graphically shown as vertical line 92, FIG. 2. The micro-processor adds the predetermined flow vector shown as line 32 to the flow vector represented as line 92, in FIG. 2, to obtain the actual pump flow rate.

Figure 9:
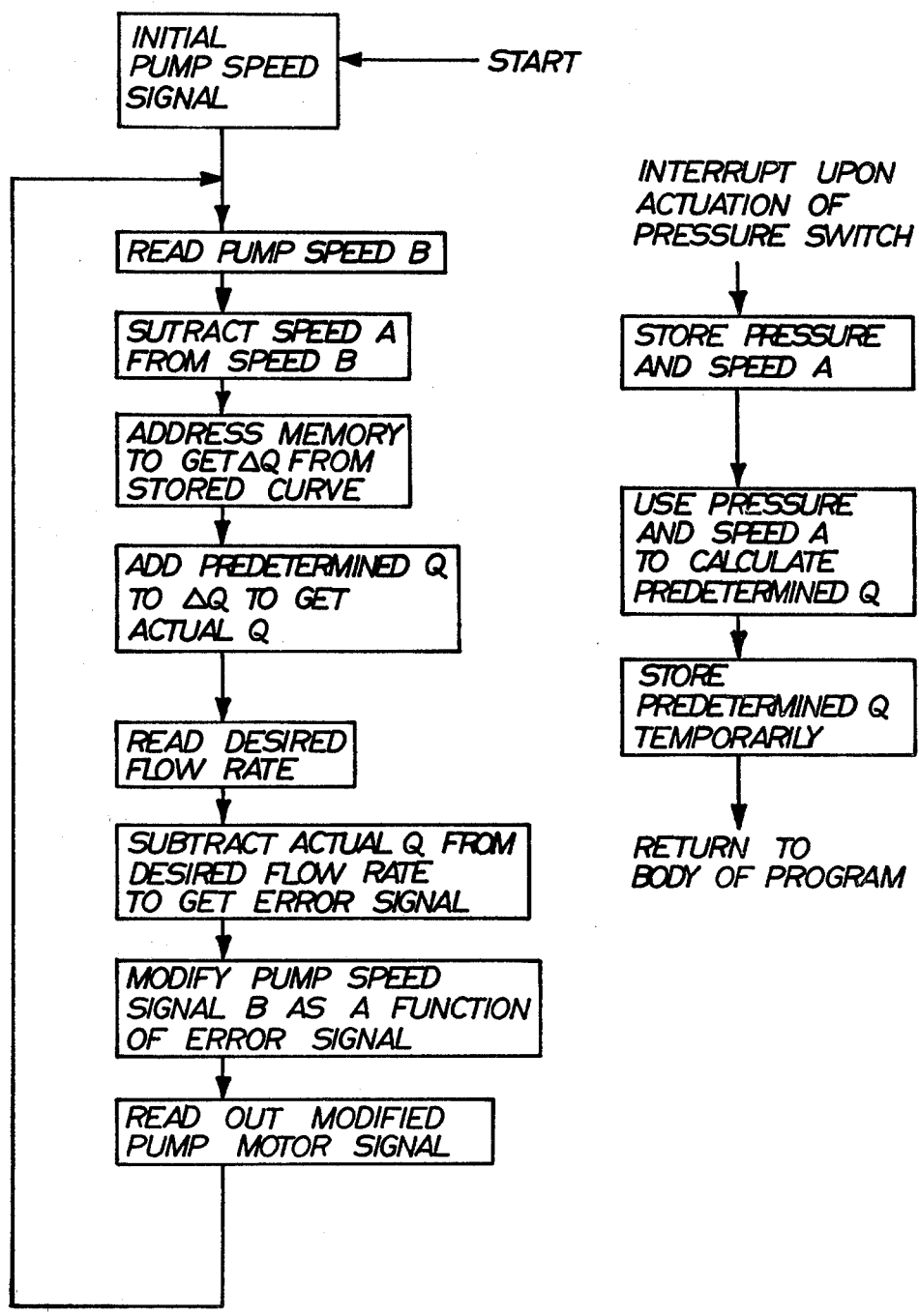
FIG. 9 is an illustration of a flow chart for the control apparatus of FIG. 8.

The desired fuel flow rate, as indicated by the position of the accelerator pedal and the engine logic control requirement signals, is then read and subtracted from the actual pump flow rate signal to provide an error signal. A new pump speed signal is then produced as a function of the error signal. The new pump speed signal is effective to cause the speed of operation of the motor 74 to be changed in order to provide a fuel flow rate corresponding to the desired fuel flow rate. The foregoing steps are repeated continuously during operation of the engine 24 and control circuitry 42. It should be noted that the main program indicated on the left portion of FIG. 9 is interrupted whenever the pressure switch 44 senses that the predetermined fuel flow rate is present.

In the embodiments of the invention previously described, the pump operating characteristics of output pressure and speed were simultaneously sensed by the pressure switch 44 and the speed sensor 68. However, the pump 22 and motor 74 operate as an assembly and preferably have the same construction shown in U.S. patent application Ser. No. 748,061 filed Dec. 6, 1976 by Drutchas et al. and entitled Pump and Motor Assembly. Due to the interaction between the pump 22 and motor 74, it is contemplated that operating characteristics of either the pump or the motor could be sensed. For example, the operating speed of the motor 74 or the back electromotive force of the motor could be sensed rather than pump operating speed. Rather than sensing the pump operating characteristic of output pressure, the torque required to drive the motor 74 or the motor field current could be sensed.

In addition, it is contemplated that the present invention may be utilized in environments other than in association with an engine. In the illustrated embodiments of the invention, the pump operating characteristic curve was determined each time the pump output pressure was decreased below a predetermined pressure. However, it is contemplated that the pump operating characteristic curve could be determined in response to the occurrence of other events.

Summary

In view of the foregoing it is apparent that the present invention provides a system which is effective to vary the speed at which a motor 74 drives the fuel pump 22 to compensate for changes in fuel pump operating characteristics with changes in pump operating conditions. In order to utilize the system, it is necessary to determine how fuel pump output will vary with changes in pump operating speed under many different operating conditions. This is determined by testing a substantial number of pumps having the same construction as the pump 22 under many different operating conditions. These tests make it possible to statistically predict how the output of the pump 22 will vary with variations in operating conditions, as represented by a series of pump output characteristic curves typified by the curves 28, 28a and 28b.

Once this has been done, it is merely necessary to determine which pump output characteristic curve of the series of curves indicates how pump output will vary with pump speed under the operating conditions which are present at any given time. Although this can be done in many different ways, it is advantageously done by using a pressure switch 44 to detect when fuel is discharged at a predetermined pressure. By simultaneously sensing pump operating speed with the sensor 68 and pump output pressure with the pressure switch 44, it is possible to determine a point on a pump output characteristic curve of a series or family of curves typified by the curves 28, 28a, or 28b FIG. 2. Since the pump output characteristic curves do not cross, the location of a single point is all that is required to determine which pump operating characteristic curve accurately indicates how pump output varies with pump operating speed under any one operating condition.

It is contemplated that the fuel pump operating conditions will vary during operation of the associated engine. Therefore, the pump operating characteristics are periodically sensed during operation of the engine in order to detect changes in the pump operating conditions. Although the sensing of the pump operating characteristics could be done in response to many different events, such as the passage of a predetermined amount of time, the pump operating characteristics are advantageously sensed each time the pressure switch 44 is actuated.

Although the actual pump control circuitry 42 could take many different forms, it is contemplated that a function generator 150 could be utilized to generate a curve having a configuration corresponding to the pump output characteristic curve. The output from the function generator 150 is modified as a function of changes in pump operating conditions as reflected by the sensing of actual pump operating characteristics.

In a digital embodiment of the control apparatus (FIG. 7), a plurality of groups of data are stored in a memory 180. Each group of data corresponds to a particular pump output operating condition. The memory 180 is searched to locate the data at an address corresponding to a particular pump operating speed and operating condition. In addition, it is contemplated that in still another embodiment a microprocessor 194 (FIG. 8) could be utilized in association with a memory 200 which stores data corresponding to the configuration of a pump output characteristic curve. This data is then modified in accordance with the sensed pump operating conditions.

Having described specific preferred embodiments of the invention, the following is claimed:

1. A method of controlling the rate at which fuel is supplied to an engine by a fuel pump, said method comprising the steps of determining a series of curves which indicate the manner in which pump output varies with pump operating speed, determining at a first time which one curve of the series of curves is representative of the manner in which fuel pump output varies with pump speed by simultaneously sensing fuel pump operating speed and output pressure during engine operation, and thereafter varying the fuel pump operating speed in accordance with the one curve to provide a desired variation in fuel pump output to the engine.

2. A method as set forth in claim 1 further including the steps of simultaneously sensing fuel pump operating speed and output pressure at a second time to determine if the fuel pump output still varies in accordance with the one curve or has changed to a second curve of the series of curves, and subsequently varying the fuel pump operating speed in accordance with the second curve to provide a desired variation in the fuel pump output if it is determined that the second curve is representative of the manner in which fuel pump output varies with pump speed.

3. A method as set forth in claim 2 further including the steps of operating the fuel pump at a first speed to provide a predetermined fuel flow rate to the engine after determining that the one curve is representative of the manner in which fuel pump output varies with pump speed, and subsequently operating the fuel pump at a second speed to provide the predetermined fuel flow rate to the engine after determining that the second curve is representative of the manner in which fuel pump output varies with pump speed.

4. A method as set forth in claim 2 further including the step of sensing fuel pump operating speed and output pressure each time the fuel pump output pressure falls below a predetermined pressure during engine operation.

5. A method as set forth in claim 1 further including the steps of providing a first signal which varies as a function of variations in the one curve with variations in pump operating speed, providing a second signal which varies as a function of variations in desired pump output, providing a third signal which varies as a function of variations in the first and second signals, and operating the pump at a speed which varies as a function of variations in the third signal to provide the desired pump output.

6. A method as set forth in claim 1 further including the step of storing data which is indicative of how pump output varies with pump speed, said step of varying fuel pump operating speed in accordance with the one curve including the step of varying the fuel pump operating speed as a function of the stored data and variations in the desired fuel pump output.

7. A method as set forth in claim 1 further including the step of storing a plurality of groups of data each group of which corresponds to one of said curves, said step of determining which one curve of the series of curves is representative of the manner in which fuel pump output varies with pump speed includes the step of selecting a group of data which corresponds to the actual pump output, said step of varying the fuel pump operating speed in accordance with the one curve includes the step of varying fuel pump operating speed in accordance with the selected group of data to provide the desired variations in fuel pump output.

8. A method comprising the steps of operating an engine, operating a fuel pump to give a predetermined fuel flow rate to the engine, varying the rate of flow of fuel to the engine by varying the speed of operation of the fuel pump, sensing a fuel pump operating characteristic each time a predetermined condition occurs, and changing the speed at which the fuel pump is operated to give the predetermined fuel flow rate to the engine in response to a sensing that the fuel pump operating characteristic has changed.

9. A method as set forth in claim 8 wherein said step of sensing a fuel pump operating characteristic includes the steps of sensing pump operating speed and sensing pump output pressure while the pump is being operated at the sensed speed.

10. A method as set forth in claim 8 wherein said step of sensing a fuel pump operating characteristic occurs each time the fuel pump output pressure falls below a predetermined output pressure.

11. A method as set forth in claim 8 further including the steps of sensing fuel pump operating speed, providing a first signal which varies as a function of variations in the sensed fuel pump operating speed, providing a second signal which varies as a function of variations in a desired fuel flow rate to the engine, and providing a third signal which varies as a function of variations in the first and second signals, and operating the fuel pump at a speed which varies as a function of variations in the third signal to provide the desired fuel flow rate to the engine.

12. A method as set forth in claim 11 further including the step of storing data which is indicative of how fuel pump output varies with fuel pump speed, said step of providing a first signal includes the step of providing a signal which varies in accordance with a function of the stored data upon variations in fuel pump speed.

13. A method as set forth in claim 11 further including the step of storing a plurality of groups of data each group of which is indicative of how the fuel flow rate varies with fuel pump operating speed for a specific value of the sensed fuel pump operating characteristic, said step of providing a first signal includes the step of selecting the group of data corresponding to an actual fuel pump operating characteristic.

14. A method of controlling the rate at which fluid is discharged from a pump and motor assembly having a fluid output which varies with variations in a pump and motor assembly operating characteristic in accordance with different curves of a series of curves at different times, said method comprising the steps of determining at a first time which curve of the series of curves is representative of the manner in which pump output varies with variations in the pump and motor assembly operating characteristic, said step of determining which curve is representative of the manner in which pump output varies with variations in the pump and motor assembly operating characteristic at the first time includes the step of locating a point on a first curve of the series of curves by sensing pump output and the operating characteristic of the pump and motor assembly at the first time, thereafter varying the pump and motor assembly operating characteristic in accordance with the first curve to provide a desired pump output, performing said steps of sensing the pump output and the operating characteristic of the pump and motor assembly at a second time to determine if the pump output still varies in accordance with the first curve or has changed to a second curve of the series of curves, and subsequently varying the pump and motor assembly operating characteristic in accordance with the second curve to provide a desired pump output if it is determined that the second curve is representative of the manner in which pump output varies with variations in the pump and motor assembly operating characteristic.

15. A method as set forth in claim 14 wherein said step of varying pump and motor assembly operating characteristic in accordance with the first curve to provide a desired pump output includes the steps of providing a first signal which varies as a function of the first curve with variations in pump operating speed, providing a second signal which varies as a function of variations in the desired pump output, providing a third signal which varies as a function of variations in the first and second signals, and operating the pump at a speed which varies as a function of variations in the third signal to provide a desired pump output.

16. A method as set forth in claim 14 wherein said steps of sensing pump output and operating characteristics of the pump and motor assembly at the first and second times each include the step of simultaneously sensing pump output pressure and pump operating speed.

17. A method as set forth in claim 14 wherein said steps of sensing pump output and operating characteristics of the pump and motor assembly at the first and second times each include the step of sensing pump output pressure.

18. A method as set forth in claim 14 wherein said steps of sensing pump output and operating characteristics of the pump and motor assembly at the first and second times each include the step of sensing pump operating speed.

19. A method of controlling the rate at which fuel is supplied to an engine by a pump having a fluid output which varies with fuel pump operating speed in accordance with different curves at different times, said method comprising the steps of operating a motor to drive the fuel pump to supply fuel to the engine during operation of the engine, providing a first signal which varies as a function of variations in a desired fuel flow rate to the engine during operation of the engine, providing a second signal which represents the fuel flow rate to the engine during operation of the engine, comparing the first and second signals and providing a third signal which varies as a function of the difference between the desired fuel flow rate represented by the first signal and the fuel flow rate represented by the second signal, varying the speed at which the motor drives the fuel pump as a function of variations in the third signal, sensing fuel pump output and operating speed each time a predetermined event occurs during operation of the engine, each time the predetermined event occurs during operation of the engine performing the step of determining which curve of the series of curves is representative of the manner in which fuel pump output varies with fuel pump operating speed, and varying the second signal as a function of fuel pump operating speed and the curve determined to be representative of the manner in which fuel pump output varies with fuel pump operating speed the last time the predetermined event occurred during operation of the engine.

20. A method as set forth in claim 19 wherein the predetermined event occurs when the fuel pump output pressure is equal to a predetermined output pressure.

21. An apparatus for use in controlling the rate at which fuel is supplied to an engine by a fuel pump, said apparatus comprising a fuel pump, control means for determining a first time which one curve of a series of curves is representative of the manner in which fuel pump output varies with pump speed during engine operation, said control means including sensor means for simultaneously sensing fuel pump operating speed and output pressure at the first time during engine operation, and drive means connected with said control means and said fuel pump for varying fuel pump operating speed in accordance with the one curve to provide a desired variation in fuel pump output to the engine.

22. An apparatus as set forth in claim 21 wherein said control means includes means for effecting operation of said sensor means to simultaneously sense fuel pump operating speed and output pressure at a second time during engine operation to determine if the fuel pump output still varies in accordance with the one curve or has changed to a second curve of the series of curves and means for varying fuel pump operating speed in accordance with the second curve to provide a desired variation in fuel pump output if it is determined that the second curve is representative of the manner in which fuel pump output varies with pump speed.

23. An apparatus as set forth in claim 22 wherein said control means further includes means for effecting operation of said drive means to operate said fuel pump at a first speed to provide a predetermined fuel flow rate to the engine when said control means determines that the fuel pump output varies in accordance with the one curve and for effecting operation of said drive means to operate said fuel pump at a second speed to provide the predetermined fuel flow rate to the engine when said control means determines that the fuel pump output varies in accordance with the second curve.

24. An apparatus as set forth in claim 22 wherein said control means includes means for effecting operation of said sensor means to sense the fuel pump operating speed and output pressure each time the fuel pump output pressure falls below a predetermined pressure during engine operation.

25. An apparatus as set forth in claim 21 wherein said control means includes first means for providing a first signal which varies as a function of the one curve with variations in pump operating speed, second means for providing a second signal which varies as a function of variations in desired fuel pump output, third means for providing a third signal which varies as a function of variations in the first and second signals, and means for effecting operation of said drive means to drive said fuel pump at a speed which varies as a function of variations in the third signal to provide the desired fuel pump output.

26. An apparatus as set forth in claim 21 wherein said control means includes data storage means for storing data which is indicative of how fuel pump output varies with fuel pump operating speed, said control means including means for varying the speed at which said drive means drives said fuel pump in accordance with the stored data and variations in the desired fuel pump output.

27. An apparatus as set forth in claim 21 wherein said control means includes data storage means for storing a plurality of groups of data each of which corresponds to one of the curves and means for determining which group of data corresponds to the actual fuel pump output.

28. An apparatus comprising an engine, a fuel pump connected in fluid communication with said engine, said fuel pump having an output flow rate which varies as a function of variations in the speed at which the fuel pump is driven and as a function of variations in fuel pump operating characteristics, variable speed motor means connected with said fuel pump for driving said fuel pump, and control means for effecting operation of said motor means to drive said fuel pump at any one of a plurality of speeds to supply fuel to said engine at a desired one of a plurality of fuel flow rates, said control means including sensor means for sensing a fuel pump operating characteristic, first means for providing a first signal which varies as a function of variations in the fuel pump operating characteristic, second means for providing a second signal which varies as a function of variations in the desired fuel flow rate to the engine, third means for providing a third signal which varies as a function of variations in the first and second signals, and means for effecting operation of said motor means to vary the speed at which said pump is driven as a function of said third signal.

29. An apparatus as set forth in claim 28 wherein said sensor means includes means for sensing fuel pump operating speed and fuel pump output.

30. An apparatus as set forth in claim 29 wherein said first means includes said means for sensing fuel pump operating speed.

31. An apparatus as set forth in claim 30 wherein said second means includes means actuated by an engine operator.

32. An apparatus as set forth in claim 31 wherein said third means includes circuit means for receiving said first and second signals and providing an output signal which varies as a function of said first and second signals.

33. An apparatus comprising an engine, a pump and motor assembly, said pump and motor assembly including a fuel pump connected in fluid communication with said engine and a motor connected with said fuel pump, said fuel pump having an output which varies as a function of variations in an operating characteristic of said pump and motor assembly and as a function of variations in different curves of a series of curves, and control means connected with said pump and motor assembly for controlling operation of said pump and motor assembly to supply fuel to the engine at a desired rate during operation of the engine, said control means including first sensor means for providing a first signal which varies as a function of variations in fuel pump output, second sensor means for providing a second signal which varies as a function of variations in the operating characteristic of said pump and motor assembly, means responsive to said first and second signals for determining which one curve of the series of curves is representative of the manner in which fuel pump output varies with variations in the operating characteristic of said pump and motor assembly and for providing a third signal which varies as a function of variations in the one curve of the series of curves with variations in the operating characteristic of said pump and motor assembly, means for providing a fourth signal which varies as a function of desired fuel flow rate to said engine, and comparator means for comparing said third and fourth signals and effecting operation of said motor to vary the fuel pump output as a function of the difference between said third and fourth signals.

34. An apparatus as set forth in claim 33 wherein said second sensor means includes means for providing a signal which varies as a function of variations in fuel pump operating speed.

35. An apparatus as set forth in claim 33 wherein said means responsive to said first and second signals includes means for storing data indicative of how fuel pump output varies with changes in the fuel pump operating characteristic.

36. An apparatus as set forth in claim 33 wherein said means responsive to said first and second signals includes means for storing a plurality of groups of data each of which corresponds to one of the curves and means for selecting one of the groups of data in response to said first and second signals.

37. An apparatus as set forth in claim 36 wherein said control means includes means for rendering said first sensor means effective to sense the fuel pump output each time a predetermined event occurs during operation of said engine.

* * * * *

UNITED STATES PATENT AND TRADEMARK OFFICE
CERTIFICATE OF CORRECTION

PATENT NO. : 4,248,194

DATED : February 3, 1981

INVENTOR(S) : Gilbert H. Drutchas et al.

It is certified that error appears in the above-identified patent and that said Letters Patent are hereby corrected as shown below:

In the drawings, sheet 4, Fig. 9, left-hand column, third box down reading:

"SUTRACT SPEED A
 FROM SPEED B"

should read:

--SUBTRACT SPEED A
  FROM SPEED B--.

Signed and Sealed this

Fifteenth Day of June 1982

[SEAL]

Attest:

Attesting Officer

GERALD J. MOSSINGHOFF

Commissioner of Patents and Trademarks